United States Patent
Sakatani et al.

(10) Patent No.: US 10,259,924 B2
(45) Date of Patent: Apr. 16, 2019

(54) SILICA AEROGEL, HEAT-INSULATION MATERIAL, AND METHOD FOR PRODUCING SILICA AEROGEL

(71) Applicant: Panasonic Intellectual Property Management Co., Ltd., Osaka (JP)

(72) Inventors: Shigeaki Sakatani, Osaka (JP); Kazuma Oikawa, Osaka (JP); Kei Toyota, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 274 days.

(21) Appl. No.: 15/359,617

(22) Filed: Nov. 22, 2016

(65) Prior Publication Data

US 2017/0174859 A1    Jun. 22, 2017

(30) Foreign Application Priority Data

Dec. 17, 2015 (JP) ................. 2015-245848

(51) Int. Cl.
| | | |
|---|---|---|
| *C08J 9/00* | (2006.01) | |
| *C08J 9/28* | (2006.01) | |
| *F16L 59/02* | (2006.01) | |
| *C01B 33/155* | (2006.01) | |

(52) U.S. Cl.
CPC ............. *C08J 9/28* (2013.01); *C01B 33/155* (2013.01); *C08J 9/0066* (2013.01); *F16L 59/028* (2013.01); *C08J 2201/05* (2013.01); *C08J 2205/026* (2013.01); *C08J 2365/00* (2013.01)

(58) Field of Classification Search
CPC .... F16L 59/028; C01B 33/146; C01B 33/155; C01B 33/1585; C01B 33/159
See application file for complete search history.

(56) References Cited

U.S. PATENT DOCUMENTS

| | | | |
|---|---|---|---|
| 5,381,149 A * | 1/1995 | Dougherty | ............... G21K 1/10 252/583 |
| 5,795,556 A | 8/1998 | Jansen et al. | |
| 7,790,787 B2 * | 9/2010 | Williams | ................... C08J 5/04 524/13 |
| 2005/0020761 A1 | 1/2005 | Arai et al. | |
| 2009/0104401 A1 | 4/2009 | Nakanishi et al. | |

FOREIGN PATENT DOCUMENTS

| | | | |
|---|---|---|---|
| CN | 104558745 | * | 4/2015 |
| WO | 2007/010949 | | 1/2007 |

OTHER PUBLICATIONS

Translation for CN 104558745, Apr. 29, 2015.*

* cited by examiner

*Primary Examiner* — C Melissa Koslow
(74) *Attorney, Agent, or Firm* — Panasonic IP Management; Kerry S. Culpepper

(57) ABSTRACT

A method for producing a silica aerogel, includes: (i) adding an electroconductive polymer to the sol of an aqueous alkaline silicate solution to convert the sol to a gel; (ii) aging the gel to cause said gel to grow; (iii) hydrophobizing the gel; and (iv) drying the gel. Further provided is a silica aerogel including an electroconductive polymer. Still further provided is a heat-insulation material, including the above-described silica aerogel and fibers.

10 Claims, 5 Drawing Sheets

FIG. 2A
FIG. 2B
FIG. 2C
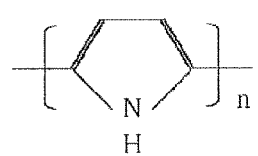
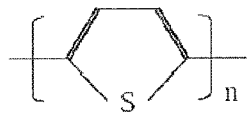
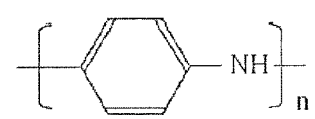

SILICA AEROGEL, HEAT-INSULATION MATERIAL, AND METHOD FOR PRODUCING SILICA AEROGEL

TECHNICAL FIELD

The present disclosure relates to a silica aerogel, a heat-insulation material, and a method for producing a silica aerogel.

BACKGROUND

Silica aerogels differs from urethane foams (PU), foamed polystyrene (EPS), and vacuum insulation panels (VIPs), in that there are almost no changes in their heat-insulation performance across the ages. Furthermore, silica aerogels have heat resistance of up to about 400° C. For these reasons, silica aerogels have attracted a great deal of attention as next-generation heat-insulation materials.

With regard to PUs and EPS that are obtained through foaming with a gas having a low heat conductivity, their heat-insulation performance deteriorates as the gas comes out of the materials over time. Moreover, PUs and EPS have poor heat resistance. VIPs have excellent heat-insulation efficiencies of several milliWatts per milliKelvin. However, over time, trace amounts of molecules of air penetrate into VIPs from their portions that have been bonded through thermal fusion bonding when core materials are vacuum-encapsulated, resulting in loss of vacuum, and therefore causing problem of degradation across the ages. Furthermore, there is also a problem that VIPs have a heat resistance of only about 100° C.

Silica aerogels are superior to any other existing heat-insulation materials in terms of deterioration with age and heat resistance. Silica aerogels have excellent heat conductivities of around 15 mW/mK. However, silica aerogels have network structures in which silica particles on the scale of several tens of nanometers are connected in rows through point contact. Accordingly, silica aerogels do not have sufficient mechanical strength. Therefore, in order to overcome this weakness, studies have been made to improve the strength by way of combining silica aerogels with fibers, unwoven fabrics, resins, etc.

In general, inorganic nanoporous materials such as silica aerogels are synthesized by the sol-gel method, which is a liquid-phase reaction. Water glass (an aqueous solution of sodium silicate) or alkoxysilane compounds such as tetramethoxysilane are used as raw materials. These materials, and a liquid medium such as water or alcohols, and, as needed, a catalyst are mixed, and are hydrolyzed. That is, the materials are subjected to polycondensation in a liquid medium to thus form a wet gel. Then, the wet gel is subjected to a silylation reaction. Finally, the liquid medium inside the wet gel is evaporated to dry the gel. Synthesis of inorganic nanoporous materials are described in WO/2007/010949, JP-A-7-257918, and JP-A-2003-183529.

SUMMARY

However, strength of aerogels synthesized by conventional arts are low in terms of their structures, and the aerogels are predisposed to charge since they have high electrical insulation properties. For example, when silica aerogels are formed into thin films, e.g., films with a thickness of 100 μm, there is a problem that the films are difficult to handle due to static electricity. Furthermore, silica aerogels also have a problem in which powder falling frequently occurs, and charged powders are transferred to adjacent areas.

As one technique for preventing their electrical charging, a technique in which addition of an electroconductive material such as carbon is involved can be mentioned. However, in techniques including addition of such a material, "transparency," which is one of features of aerogels, will be impaired.

Moreover, inclusion of a hydrophilic polymer in the raw materials can be considered in order to prevent electrical charging. However, such a polymer is not compatible with an aqueous sol solution based on water glass that serves as one raw material, and it becomes impossible to synthesize an aerogel. Furthermore, even if the aqueous sol solution turns into a gel, the resulting gel will be turbid, and the transparency will be impaired.

Additionally, static elimination using an ionizer, or reforming based on plasma discharging can be applied to silica aerogels. However, these techniques merely bring about temporal effects, and any persistent effects of electrical charging cannot be expected.

Thus, it has been impossible to prevent electrical charging while maintaining transparency in silica aerogels.

Therefore, purposes of the disclosure are to provide a silica aerogel in which the charge amount is reduced while transparency intrinsically possessed by silica aerogels is not impaired, and to further provide a heat-insulation material using the silica aerogel, and a method for producing the silica aerogel.

As solutions to achieve the above-described purposes, provided is a method for producing a silica aerogel, including: (i) adding an electroconductive polymer to a sol of an aqueous alkaline silicate solution to convert the sol to a gel; (ii) aging the gel to cause said gel to grow; and (iii) hydrophobizing the gel; and (iv) drying the gel. Further provided is a silica aerogel including an electroconductive polymer. Still further provided is a heat-insulation material, including: the above-described silica aerogel; and fibers.

According to the disclosure, while excellent heat-insulation performance, transparency, and heat resistance of silica aerogel are maintained, the heat-insulation resistance is reduced, and thus, it becomes possible to synthesize heat-insulation particles and a thin heat-insulation sheet in which contamination due to powder falling, or deficiency in handling properties due to electrostatic charging will not occur.

BRIEF DESCRIPTION OF THE DRAWINGS

FIGS. 2A-2C are structural diagrams that show examples of an electroconductive polymer in an embodiment.

DESCRIPTION OF EMBODIMENTS

One embodiment of the disclosure will be described with reference to FIG. 1.

A method for producing a silica aerogel according to an embodiment is characterized in that a water-soluble or water-dispersible electroconductive polymer is added to a sol solution. This makes it possible to prepare an aerogel that hardly electrically charges while having sufficient insulation properties.

In addition, a method for synthesizing an aerogel in this embodiment can be incorporated also into any other synthesis methods using water glass-based materials. Conditions described herein are one example, and adoptable conditions are not limited to the described conditions.

(Overview of the Production Method)

The silica aerogel and the method for producing the same according to this embodiment will now be described. Steps for producing the aerogel according to this embodiment will be shown below.

Figure 1:
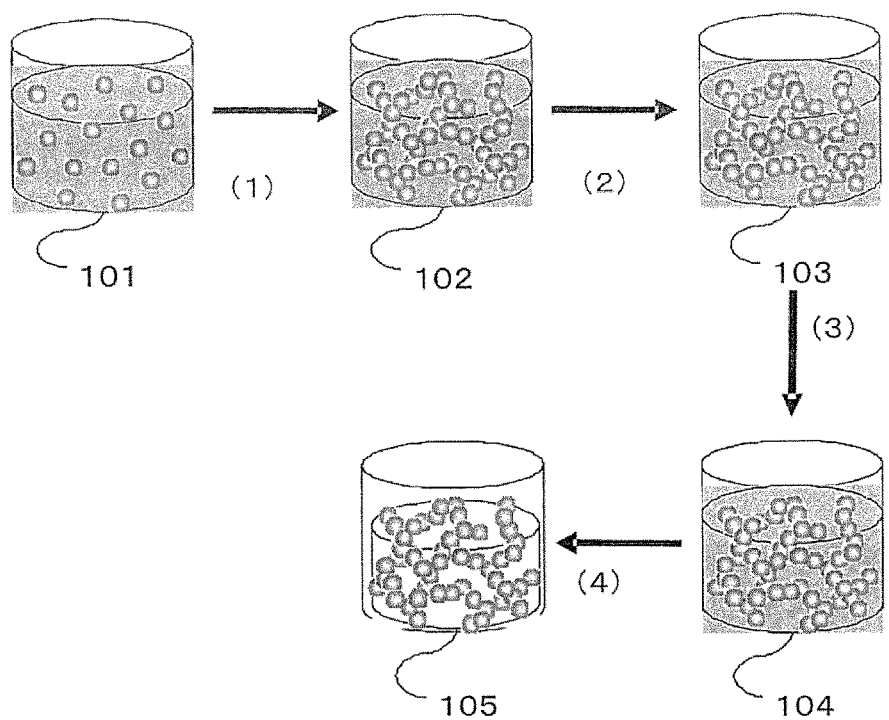
FIG. 1 is a diagram that shows one example of steps for producing a silica aerogel in an embodiment.

One example of the states in the respective steps from preparation to drying of a sol 101 are shown in FIG. 1.

The gel-preparation step (1) is a step in which an aqueous alkaline silicate solution is converted into a gel. At first, an aqueous alkaline high-molar-ratio silicate solution with a silicate concentration of 10% to 20% is prepared from an aqueous alkaline low-molar-ratio silicate solution with a molar ratio $SiO_2/Na_2O$ of about 0.5 to 4. Then, hydrochloric acid and an electroconductive polymer are added to the high-molar-ratio-silicate solution, and the resulting mixture is stirred to adjust the pH to 7.0 to 7.5, thus converting the sol 101 into a gel.

The aging step (2) is a step for reinforcing a skeleton of silica after gelatinization. A hydrogel 102 is heated for 12 hours in a furnace at 80° C. This reinforces the skeleton of the hydrogel, and thus, a hydrogel 103 with a reinforced skeleton is prepared.

The hydrophobization step (3) is a step for hydrophobizing a surface of the aerogel in order to prevent contraction of the aerogel during drying. The hydrogel is caused to react with an active species (trimethylsilyl chloride in this embodiment) in a mixture solution of hexamethyldisiloxane (HMDSO), hydrochloric acid, and 2-propanol, in a furnace at 55° C. for 12 hours, thereby preparing a surface-modified gel 104.

In the drying step (4), the gel with a modified surface (modified with a trimethylsilyl group in this embodiment) is dried in a furnace at 150° C. for 2 hours, thereby preparing an aerogel 105.

In addition, for a value of insulation resistance (ohm) of the resulting gel, a value on the scale of $10^{6-11}$ is preferable. If the value is on the scale of $10^{12}$ or more, the insulation properties will be too high, and therefore, a state in which the gel is likely to bear static electricity will be maintained. On the other hand, if the value is on the scale of $10^5$ or less, a possibly-separated powder of the gel or electroconductive polymer needs to be regarded as conductive, and therefore, such a scale is not preferable for electric insulation sheets.

Details on Production (1) Gel-Preparation Step

In the gel-production step, an acid is added to a basic aqueous high-molar-ratio-silicate solution to make the solution acidic, and then, polycondensation is carried out.

The aqueous alkaline high-molar-ratio-silicate solution is produced from water glass. Water glass is an aqueous sodium silicate solution or an aqueous silicate soda solution, and is a liquid in which $SiO_2$ (silica) and $Na_2O$ (sodium oxide) are dissolved in $H_2O$ at various ratios.

A molecular formula of water glass is $Na_2O \cdot nSiO_2 \cdot mH_2O$ in which n is a molar ratio representing a mixing ratio of $Na_2O$ and $SiO_2$. The aqueous high-molar-ratio-silicate solution is a material that is obtained by removing sodium, which is unnecessary for formation of aerogels, from water glass, followed by stabilization of the material at the basic region, and is neither water glass nor colloidal silica. As one of features of the aqueous high-molar-ratio-silicate solution, it can be mentioned that a particle diameter of the sol falls within an intermediate-size range (1-10 nm) between sizes of water glass and colloidal silica.

If an aqueous silicate solution with a sol particle diameter of less than 1 nm is used, simultaneous pursuit of the above-mentioned small pore diameter and specific surface area becomes difficult. Therefore, consequently, only fragile and breakable aerogels are synthesized.

If silica with a sol particle diameter of more than 10 nm is used, the reactivity is lowered, and therefore, a homogenous gel cannot be formed.

<Aqueous High-Molar-Ratio-Silicate Solution>

With regard to a method for producing the aqueous high-molar-ratio-silicate solution, the aqueous high-molar-ratio-silicate solution can be produced at least by the following steps using an aqueous alkaline low-molar-ratio silicate solution as a starting material.

(a) adding an acid to an aqueous alkaline low-molar-ratio silicate solution to produce a by-product salt;

(b) immediately after above Step (a), bringing the aqueous solution into contact with a pressure-driving semipermeable membrane to concentrate the aqueous solution, and simultaneously separating and removing the by-product salt produced in above Step (a); and (C) subsequent to above Step (b), or simultaneously with above Step (b), continuously or intermittently adding water to the aqueous solution, and again bringing the aqueous solution into contact with the pressure-driving semipermeable membrane in above Step (b) to concentrate the aqueous solution, and simultaneously separating and removing the by-product salt produced in above Step (a), in a repetitive manner. The aqueous high-molar-ratio-silicate solution in this embodiment is an aqueous silicate solution including 10% or more of silica.

As a method for producing an aqueous silicate solution including 10% or more of silica, although the above-described method is adopted in this embodiment, it is not limited to that method. However, when a general aqueous water glass solution No. 4 is caused to pass through an ion-exchange resin to remove sodium, salts are deposited on the surface of the ion-exchange resin, and therefore, removal of sodium cannot efficiently be carried out, unless the aqueous solution is diluted to less than 10%. Accordingly, in this technical field, when sodium is removed from water glass that is an aqueous alkaline low-molar-ratio-silicate solution, generally, the aqueous solution is diluted to less than 10%, and then, is converted into a gel through a dehydration-condensation reaction. Therefore, according to such a technique, it is difficult to increase the concentration of silica to the concentration level achieved by the present embodiment.

The molar ratio of the aqueous high-molar-ratio-silicate solution which is used as a material in this embodiment is preferably 15 to 30, and is more preferably 20 to 30 in order to reduce the aging time or to improve the strength of the gel skeleton.

The aqueous high-molar-ratio-silicate solution that is used as a material in this embodiment preferably have a silicate concentration of 10% to 20%, more preferably 12% to 16%.

If the silicate concentration is less than 10%, the strength of the skeleton of the wet gel may be insufficient in the same manner as conventional arts, since the silicate concentration is low.

If the silicate concentration exceeds 20%, a time required for gelatinization of the sol solution is rapidly shortened, and it may be impossible to control the gelatinizing time.

<Electroconductive Polymer>

When the sol is converted into a gel, an electroconductive polymer is added to the reaction mixture. For the electroconductive polymer, polypyrroles as shown in FIG. 2A, polythiophenes as shown in FIG. 2B, and polyanilines as shown in FIG. 2C can be used. In this embodiment, a water-soluble or water-dispersible electroconductive polymer is preferably used as the electroconductive polymer.

Figure 3:
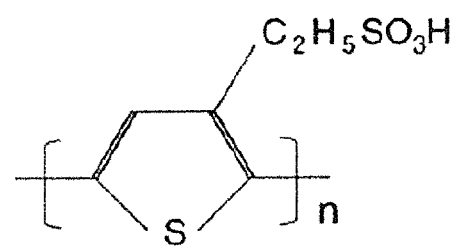
FIG. 3 is a structural diagram that shows an example of an electroconductive polymer in an embodiment.

For the electroconductive polymer, for example, as shown in FIG. 3, a molecule having a structure including poly(3-thiophene-ethylsulfonic acid), which is water-soluble and which can be obtained by introducing a substituent group directly into a monomer, can be used.

<Copolymer of a Water-Soluble Polymer and an Electroconductive Polymer>

Also, a water-soluble polymer intramolecularly having a sulfo group, which is compatible with water, can be used as a dopant/dispersing agent.

That is, monomers that constitute an electroconductive polymer are oxidatively polymerized in an aqueous solution of a water-soluble polymer. According to this process, a part of sulfo groups possessed by the water-soluble polymer is doped to the electroconductive polymer. Furthermore, the water-soluble polymer and the electroconductive polymer are integrated to form a water-soluble electroconductive polymer.

As a result, due to the rest of sulfo groups, water solubility can be imparted to the copolymer of the electroconductive polymer and the water-soluble polymer. Accordingly, a water solution in which electroconductive polymers are finely dispersed can be prepared.

In this case, the water-soluble polymer intramolecularly has at least one highly-polar functional group (e.g. an amino group, hydroxyl group, carboxyl group, carbonyl group, and sulfo group). Accordingly, the water-soluble polymer is easily mixed with water and the electroconductive polymer, and the reaction homogenously proceeds.

As specific examples of the water-soluble polymer, polythiophene sulfonic acids, polyvinyl sulfonic acids, and polyacrylamide sulfonic acids can be mentioned.

Figure 4:
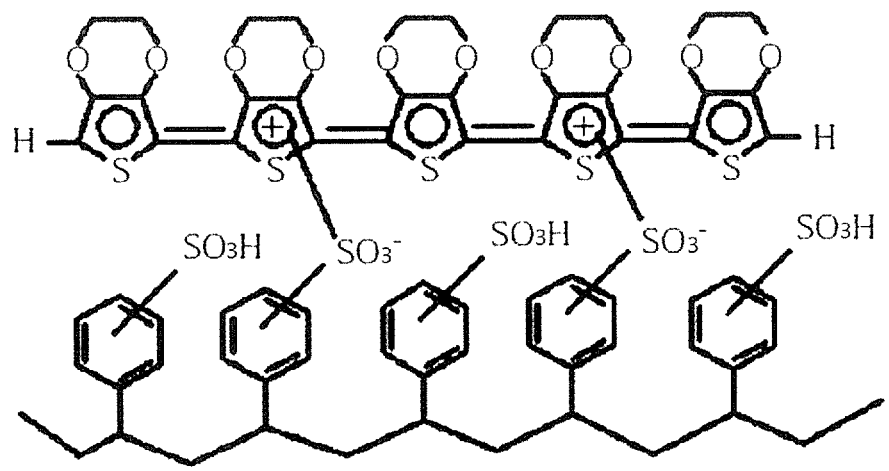
FIG. 4 is a structural diagram that shows an example of a water-soluble electroconductive polymer in an embodiment.

As the most typical example of applicable water-soluble electroconductive polymer, a water-dispersible polythiophene derivative as shown in FIG. 4 (i.e., PEDOT-PSS) that is obtained by using a polystyrene sulfonate (PSS) that serves as the water-soluble polymer, and 3,4-ethylenedioxythiophene (EDOT) that serves as monomers of the electroconductive polymer can be mentioned.

Furthermore, for the water-soluble electroconductive polymer, an aqueous dispersion of a copolymer of ethyl 3-methyl-4-pyrrolecarboxylate and butyl 3-methyl-4-pyrrolecarboxylate, which are both polypyrroles, can also be used.

In addition, an additive for improving adhesiveness, moisture resistance, and/or weather resistance can be included as long as the amount thereof is minute.

With regard to a particle size of the electroconductive polymer used herein, a dispersion of those having a size of 1 nm to 100 nm as primary particles is preferably used. If the particle diameter is larger than 100 nm, the size of the electroconductive polymer present in the aerogel will be large, and the transparency will significantly be decreased, e.g., to 10% or less. Additionally, if the particle diameter is less than 1 nm, sufficient antistatic effects cannot be realized unless an excessive amount of the electroconductive polymer is included. Therefore, such a range is considered to be uneconomical.

(Catalyst)

In order to promote a hydrolysis reaction of silica in the aqueous alkaline high-molar-ratio-silicate solution, an acid catalyst is preferably added to the solution.

With regard to types of acid used herein, inorganic acids such as hydrochloric acid, nitric acid, sulfuric acid, hydrofluoric acid, sulfurous acid, phosphoric acid, phosphorous acid, hypophosphorous acid, chloric acid, chlorous acid, and hypochlorous acid; acidic phosphates such as acidic aluminum phosphate, acidic magnesium phosphate, and acidic zinc phosphate; and organic acids such as acetic acid, propionic acid, oxalic acid, succinic acid, citric acid, malic acid, adipic acid, and azelaic acid, among others, can be mentioned. Although types of acids used herein are not limited, hydrochloric acid is preferable since the resulting silica aerogel will have sufficient strength of the gel skeleton, and sufficient hydrophobicity.

For example, the concentration is preferably 1 to 12 N, more preferably 6 to 12 N when the acid is hydrochloric acid.

An amount of the acid catalyst added to the reaction mixture depends on a pH value that the reaction mixture is adjusted to. However, when 12 N aqueous hydrochloric acid is used, 0.5% to 6.0% thereof is preferably added, and, 1.0% to 3.0% thereof is more preferably added, given that the weight of the hydrogel is regarded as 100%.

A sol solution that is prepared by adding the above acid catalyst to the aqueous high-molar-ratio-silicate solution is converted to a gel. Gelatinization of the sol is preferably carried out inside a closed vessel that prevents a liquid medium from volatilizing.

When an acid is added to the aqueous high-molar-ratio-silicate solution to carry out gelatinization, the pH during that process is preferably 5.0 to 8.0.

A temperature for gelatinization of the sol is preferably 0° C. to 100° C., more preferably 20° C. to 90° C. under ordinary pressure. That is, gelatinization will occur even at ordinary temperatures, but the chemical reaction of gelatinization can be accelerated by heating the reaction mixture.

In addition, the time for gelatinization varies with the temperature for gelatinization, and a time required for aging (aging time described below) carried out after gelatinization. However, the sum of the gelatinization time and the aging time is preferably 0.5 to 72 hours, more preferably 2 to 24 hours. By carrying out gelatinization and aging in this manner, a wet gel that has improved strength and rigidity of the gel wall and that hardly shrinks during drying can be obtained.

When the sol solution is soaked into fibers of unwoven fabric or glass wools to convert it to a gel, the sol solution that has been adjusted to a predetermined pH may preliminarily be coated onto the fibers by use of a dispenser or the like, and then, may be converted into a gel.

For an even industrial purpose, in terms of sufficient pot life of the sol solution, the following way is preferable. That is, a sol preparation in which twice the amount of the acid that is required to cause a desired gelatinization reaction is included, and a sol preparation not including the acid are prepared, these preparations are discharged separately from respective tanks, and then, are mixed together and coated directly onto the unwoven fabrics or glass wools.

(2) Aging Step

A temperature for aging (aging temperature) is preferably 50° C. to 100° C., more preferably 60° C. to 80° C. under ordinary pressure.

A time for aging (aging time) depends on the aging temperature. However, the aging time is preferably 0.5 to 24 hours in view of sufficient productivity. The aging time is more preferably 6 to 18 hours.

Furthermore, in order to prevent elution of silica, it is effective to carry out aging in the presence of saturated water vapor. Furthermore, it is also effective to carry out aging in a steamed state. For the industrial purpose, it is preferable that aging is carried out in a tank that makes it possible to stably maintain a high-temperature and high-humidity environment, e.g. at 85° C. and at a humidity of 85%. In this embodiment, in order to prevent drying of the outermost surface of the gel, aging is carried out in a condition in which the surface is covered with a film of polypropylene.

(3) Hydrophobizing Step

An aged wet gel (also called hydrogel; a gel containing water) is reacted with a silylating agent to achieve hydrophobizing of the gel.

In this embodiment, for a hydrophobization reaction that is provided in the method for producing an aerogel, for example, a trimethylsilylation reaction of a silanol is carried out by use of hexamethyldisiloxane (hereinafter, referred to as HMDSO), e.g., in a mixture solvent of HMDSO, HCl and IPA.

In the hydrophobization reaction, HCl can also be included at a molar ratio of 0.01 to 2.0 with respect to the amount of HMDSO to produce TMCS which severs as an active species in the reaction system. In that case, the concentration of the aqueous hydrochloric acid is preferably 1 to 12 N, more preferably 6 to 12 N.

The amount of the silylating agent added to the reaction is preferably 100% to 800%, more preferably 100% to 300% with respect to the volume of pores in the hydrogel since hydrophobization can efficiently be carried out. In addition, the amount of HMDSO (silylating agent) added to the reaction mixture is determined based on the volume of pores in the hydrogel, and, for example, in cases where the amount of the silylating agent is 150%, this means that 1.5 times the amount of the silylating agent to the volume of pores in hydrogel is added thereto.

The hydrophobization reaction may be carried out in a solvent, as needed, and, is generally carried out at 10° C. to 100° C., preferably 40° C. to 70° C., which are considered as temperature ranges that make it possible for the reaction to efficiently proceed while making it possible to prevent vaporization of the liquid.

For the solvent used herein, alcohols such as methanol, ethanol, and 2-propanol; ketones such as acetone, and methylethylketone; and linear aliphatic hydrocarbons such as pentane, hexane, and pentane are preferable. Furthermore, in order to cause the reaction to more efficiently proceed, the aged hydrogel may be soaked in HCl in advance, and then, may be soaked in a bath filled with a silylating agent such as HMDSO, thereby carrying out a trimethylsilylation reaction of silanols. In order to enhance the permeability, an amphiphilic liquid such as IPA may be added to the reaction mixture as needed.

(4) Drying Step

In the drying step, in order to volatilize the liquid medium in the hydrophobized gel obtained in the former step, any drying technique can be used. For example, any known techniques such as the supercritical drying method or non-supercritical drying method (ordinary-pressure drying methods, freeze-drying methods, etc.) can be adopted, and the method used herein is not limited.

However, the supercritical drying method under ordinary pressure is preferably used in view of sufficient productivity, safeness and economic efficiency. The drying temperature and the drying time are not limited. However, if the gel is drastically heated, bumping of the solvent in the wet gel may occur, possibly causing large cracks in the silica aerogel.

If cracks appear in the silica aerogel, heat transfer may be caused due to convection of the air, and, consequently, heat-insulation properties may be impaired, or the silica aerogel may be formed into a powder, thus significantly impairing easiness in handling, although it depends on sizes of cracks. Furthermore, if the silica aerogel is dried in a high-temperature environment, e.g., at 400° C. or more, the silylating agent, which has maintained hydrophobicity of the aerogel, may be released through heat decomposition, and the resulting gel may be a hydrogel that loses hydrophobicity. Therefore, in order to suppress occurrence of cracks, in the drying step, the gel is preferably dried at a temperature that is sufficient to volatilize the liquid in the gel at ordinary pressures, e.g., at 0° C. to 200° C., for 0.5 to 5 hours.

<Effects>

The silica aerogel obtained in this way according to the present embodiment has sufficient electrical insulation properties while having less incidence of charging and powder falling than conventional aerogels. The aerogel synthesized in this way has a pore diameter of 10 to 68 nm, which is smaller than the mean free path of the air, and have excellent heat-insulation performance. Therefore, the aerogel can preferably be available for use in home electric appliances, automobile parts, the field of architecture, industrial facilities, etc.

EXAMPLES

Hereinafter, present embodiments will be described on the basis of examples. However, present embodiments are not limited to the examples described below. All reactions were carried out under the atmosphere.

<Evaluations>

For analysis and evaluation on microstructures of aerogels, the nitrogen adsorption method called BET measurement was used, and a fully-automatic gas adsorption amount measurement apparatus Autosorb-3b (YUASA IONICS CO., LTD.) was used. For measurement of heat conductivities, a heat flow meter HFM 436 Lambda (NETZSCH GROUP) was used.

For an electric conductivity meter, a resistivity meter Hiresta-UX MCP-HT800 (MITSUBISHI CHEMICAL ANALYTECH CO., LTD.) was used to measure insulation resistance values of prepared sheet-like samples.

A hazemeter HAZEMETER TC-H3DPK/3 (TOKYO DENSHOKU CO., LTD.) was used to measure transmissivities, which serves as indexes for representing transparency, with respect to sheets with a thickness of 1 mm.

Figure 5:
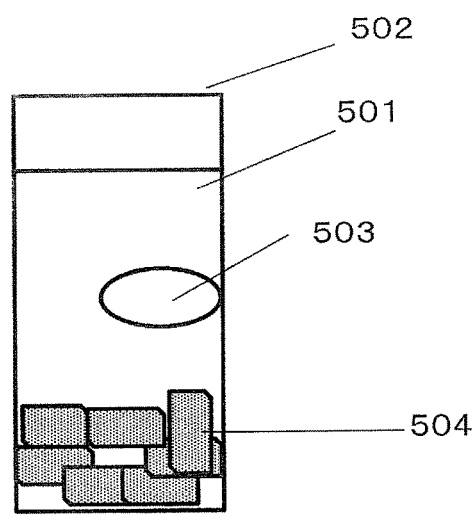
FIG. 5 is a lateral view of a screw tube that is used for evaluation in an embodiment.

Furthermore, a method for confirming charging states of prepared silica aerogel will be described with reference to FIG. 5. Silica aerogel beads 504 were placed in a glass screw tube 501, and the screw tube 501 was sealed with a plastic cap 502. Then, the screw tube 501 was shaken, and a degree of adhesion of xerogel fine powder onto the surface of glass wall in a fine-gel-powder-adhering observation area 503 due to static electric charge was then visually observed to compare the degrees of adhesion among samples.

Details on conditions in respective examples and comparative examples will described below. In addition, the conditions, observed properties, and judgement of acceptance in the examples and the comparative examples are summarized in Table 1. In addition, with regard to a priority list for judgement, results of heat conductivity measurement, degrees of adhesion of gel onto screw tubes, and insulation resistivities were given priority in this order.

In addition, SEPLEGYDA AS-Q009 contained 0.5 to 2 wt % of a polythiophene resin mixture that served as an electroconductive polymer. SEPLEGYDA refers to a polythiophene electroconductive polymer that have transparency superior to other electroconductive polymers, and is a trademark of SHIN-ETSU POLYMER CO., LTD. AS-Q009

TABLE 1

|  | Synthesis Conditions | | Heat conductivity (mW/mK) | Evaluation on charging properties (adhesion onto screw tubes) | Digit number of insulation resistivities ($\Omega$) | Thickness (mm) | Specific surface area ($m^2/g$) | Mean pore distribution (nm) | Transmissivity (%) | Overall Evaluation |
|---|---|---|---|---|---|---|---|---|---|---|
|  | Silica Concentration | Conductive material | | | | | | | | |
| Example 1 | Silica 16% | SEPLEGYDA 1% | 20 | Acceptable | $10^9$ | 1.1 | 290 | 59 | 32 | Acceptable |
| Example 2 | Silica 16% | SEPLEGYDA 0.6% | 20 | Acceptable | $10^9$ | 1.1 | 312 | 59 | 36 | Acceptable |
| Example 3 | Silica 8% | SEPLEGYDA 1% | 18 | Acceptable | $10^9$ | 1 | 742 | 7.5 | 30 | Acceptable |
| Comparative Example 1 | Silica 16% | None | 20 | Unacceptable | $10^{12}$ | 1.1 | 385 | 37 | 40 | Unacceptable |
| Comparative Example 2 | Silica 8% | None | 18 | Unacceptable | $10^{12}$ | 1 | 700 | 20 | 38 | Unacceptable |
| Comparative Example 3 | Silica 8% | Toluene-dispersed polyaniline 1% | 32 | Acceptable | $10^9$ | 1 | 150 | 130 | 11 | Unacceptable |

With regard to heat conductivities, 26 mW/mK, which is the heat conductivity of still air, was used as a standard, and, when a sample exhibited a value larger than this standard, it was considered that synthesis of aerogel succeeded.

Specific acceptability criteria were not provided for transmissivities and specific surface areas. With regard to mean pore diameters, 68 nm or less (the mean free path of the air was 68 nm) was used as an acceptance criterion. This is because, when the mean pore diameter is larger than this criterion, it is considered that the heat conductivity exceeds 26 mW/mK.

With regard to observation of adhesion of samples onto screw tubes, the presence or absence of adhesion of white silica fine powders to screw tubes were confirmed by visual inspection. When a fine powder was adhered to a screw tube, it was considered that there was static electricity-caused adhesion. Furthermore, with regard to insulation resistivities, a range from $10^6$ to $10^{11}$ was adopted as an acceptance criterion. When the insulation resistivity is $10^{12}$ or larger, the insulation properties are too high, and therefore, a state in which the gel is likely to retain static electricity would be maintained. On the other hand, in cases where the insulation resistivity is $10^5$ or less, if a powder of the gel or electroconductive polymer falls out, it is required that the fallen powder is regarded as conductive. Therefore, such a sample is not preferable as an electrical insulation sheet.

Example 1

0.08 g of hydrochloric acid (KANTO KAGAKU; Shika-special-grade; 12N) serving as an acid catalyst was added to 5.02 g of an aqueous alkaline high-molar-ratio-silicate solution (TOSO SANGYO Co., Ltd.; 16 wt % of $SiO_2$ and 0.57 wt % of $Na_2O$) that had been prepared from an aqueous alkaline low-molar-ratio-silicate solution, 0.05 g of SEPLEGYDA AS-Q009 (manufactured by SHIN-ETSU POLYMER CO., LTD.) serving as an electroconductive polymer was further added thereto, the resulting mixture was stirred thoroughly, and the pH of the aqueous high-molar-ratio-silicate solution was adjusted to 7.3. The sol solution was converted to a gel at room temperature for 5 minutes, and the resulting gel was subjected to aging in a furnace at 80° C. for 12 hours.

refers to a solution in which the electroconductive polymer with a size between 1 to 100 nm and trace amounts of other additives are dispersed.

Next, hexamethyldisiloxane (hereinafter, referred to as HMDSO; MW: 162.38; bp: 101° C.; d0.764 g/ml (20° C.); SHIN-ETSU CHEMICAL CO., LTD.; KF-96L-0.65cs), HCl, and 2-propanol were added to the aged gel. The amount of HMDS added thereto was equivalent to 750% of 4.2 mL, which corresponded to the volume of pores in the hydrogel (i.e., 31.5 mL; 24.1 g; 148 mmol). The amounts of HCl and 2-propanol added thereto were 2 equivalents (296 mmol) and 1 equivalent (148 mmol), respectively, with respect to HMDSO in terms of molar ratios. Then, the mixture was subjected to hydrophobization in a furnace at 55° C. for 12 hours in the same manner. Two phases were recognized in the reaction solution (upper layer: HMDSO; and lower layer: aqueous HCl), and the gel was present in the bottom part of the lower layer at an early phase of the reaction. However, the gel floated to the upper layer after completion of the reaction. Then, the gel was harvested, and was subjected to heat-drying at 150° C. in the air for 2 hours, thereby obtaining a colorless and transparent silica aerogel.

Moreover, the produced silica aerogel was placed inside the screw tube, and the screw tube was shaken to confirm a charging state of the sample. As a result, it was observed that adhesion of the fine powder was suppressed, and it was confirmed that charging-preventing effects were obtained.

Furthermore, a sol solution that had been prepared to have the same liquid composition was soaked into a polyester unwoven fabric 1 mm thick, and then, was converted into a gel therein. In the same manner as the above synthesis of only the gel, the sample was subjected to aging, hydrophobizing and drying steps to thereby prepare a silica aerogel synthesis sheet. The prepared sheet was evaluated. Results are shown in Table 1.

Example 21

0.03 g of SEPLEGYDA AS-Q009 (manufactured by SHIN-ETSU POLYMER CO., LTD.) serving as an electroconductive polymer was added to a reaction mixture. Other conditions were the same as Example 1.

Example 31

5.01 g of water glass (FUJI KAGAKU CORP.; $SiO_2$; 8.0 wt %; $2Na_2O.3SiO_2.mH_2O$) was stirred together with 10 g of an H-type ion-exchange resin (SUMIKA CHEMTEX CO., LTD.; Duolite C20) until the pH exhibited 2.0. Then, the ion-exchange resin was separated from the aqueous solution by filtration, 0.05 g of SEPLEGYDAAS-Q009 (manufactured by SHIN-ETSU POLYMER CO., LTD.) was added to the aqueous solution, the aqueous solution was uniformly stirred, and then, 0.5 mol of aqueous ammonia (KANTO KAGAKU; special-grade; 1 mol/L) was added to the aqueous solution to adjust the pH to 4.0.

The aqueous solution was subjected to gelatinization at room temperature for 20 minutes, and then, the gel was aged at 50° C. for 24 hours. Next, HMDSO (MW: 162.38; bp: 101° C.; d0.764 g/ml (20° C.); SHIN-ETSU CHEMICAL CO., LTD.; KF-96L-0.65 cs). HCl, and 2-propanol were added to the aged gel. The amount of HMDS added thereto was equivalent to 600% of 4.37 mL, which corresponded to the volume of pores in the hydrogel (i.e., 26 mL; 34.0 g; 210 mmol). The amounts of HCl and 2-propanol added thereto were 2 equivalents (420 mmol) and 1 equivalent (210 mmol), respectively, with respect to HMDSO in terms of molar ratios. Then, the mixture was subjected to hydrophobization in a furnace at 55° C. for 12 hours in the same manner. Two phases were recognized in the reaction solution (upper layer: HMDSO; and lower layer: aqueous HCl), and the gel was present in the bottom part of the lower layer at an early phase of the reaction. However, the gel floated to the upper layer after completion of the reaction. Then, the gel was harvested, and was subjected to heat-drying at 150° C. in the air for 2 hours, thereby obtaining 0.33 g of a colorless and transparent silica aerogel. The mean pore diameter and the specific surface area of the resulting aerogel were 7.5 nm and 747 $m^2/g$, respectively.

Comparative Example 1

In contrast to Example 1, any electroconductive polymer was not added to the reaction mixture in the blending step. Other conditions were the same as those in Example 1.

Comparative Example 2

In contrast to Example 3, any electroconductive polymer was not added to the reaction mixture in the blending step. Other conditions were the same as those in Example 3. The mean pore diameter and the surface specific area of the resulting aerogel were 20 nm and 700 $m^2/g$, respectively.

Comparative Example 3

In contrast to Example 3, instead of the electroconductive polymer SEPLEGYDA, 0.05 g of a toluene-dispersed polyaniline type (T) (KAKENSANGYOU CORPORATION) was added to the reaction mixture in the blending step. Other conditions were the same as those in Example 3. The mean pore diameter and the surface specific area of the resulting aerogel were 130 nm and 150 $m^2/g$, respectively.

DISCUSSION

As seen from Table 1, charging-preventing effects were confirmed in Examples 1, 2 and 3 in which electroconductive polymers were included, and also, it was confirmed that their insulation resistivities were lowered to the scale of $10^9$.

When an aerogel is synthesized from a silica sol solution that includes a water-glass-type material, by use of a sol-gel reaction, it is important to synthesize a structurally-homogenous gel from the sol preparation solution.

Judging from results of Examples 1, 2 and 3, even when electroconductive polymers were added to the systems of aqueous water-glass-based sol solutions, the electroconductive polymers did not promote crystallization of silica, and the solutions came into states of bluish transparent sol solutions (originally, colorless transparent solutions), and it was estimated that the electroconductive polymers were trapped inside skeletons of gels, since the amounts of the electroconductive polymers added to the solutions were very small, i.e., 1% or less. This was obvious because any bluish ingredients were not eluted in the processes of hydrophobization, and it was considered that the electroconductive polymers were solidified together with silica particles in the aerogels. From these observations, it is considered that polypyrrole-type, polyaniline-type, and polythiophene-type electroconductive polymers can bring about the same effects as long as these materials have water-soluble side chains.

Furthermore, among a number of electroconductive polymers, when electroconductive polymers that do not have, in their structure, any functional groups compatible with water and that are dispersible only in organic solvents or the like were added to systems of aqueous water-glass-based sol solutions, the solutions immediately yielded a white turbidity. Thus, it was revealed that such electroconductive polymers inhibit gelatinization, and therefore, such electroconductive polymers were considered unsuitable at a step of preliminary studies.

Meanwhile, in consideration of results of Comparative Example 3, even if the same types of electroconductive polymers are used, crystallization of water-glass-based sol solution will occur in dispersions using organic solvents such as toluene, or in systems including alcohols. Therefore, it is considered that a homogenous gel synthesis reaction through the sol-gel reaction of silica will be impaired in such dispersions or systems. As a result, even if insulation resistivities are reduced as a consequence, it is obvious that, according to such dispersions or systems, characteristics such as low heat conductivity and excellent transparency that silica xerogels naturally possess cannot be retained. In present embodiments, for example, the molecule that has a structure including poly(3-thiophene-ethylsulfonic acid) that is obtained by introducing a substituent group into a monomer and that realizes water solubility, as shown in FIG. 3 can be adopted.

In view of the above observations, water-soluble electroconductive polymers that intramolecularly include a sulfo group compatible with water that serve as a dopant/water-dispersing agent are preferably used. For example, polythiophene sulfonic acids; polyvinyl sulfonic acids; polyacrylamide sulfonic acids; a water dispersible polythiophene derivative (PEDOT-PSS) using a polystyrene sulfonate (PSS), which serves as the water-soluble polymer, 3,4-ethylenedioxythiophene (EDOT), which serves as a monomer of the electroconductive; and an aqueous dispersion of a copolymer of ethyl 3-methyl-4-pyrrolecarboxylate and butyl 3-methyl-4-pyrrolecarboxylate, which are both polypyrroles, are preferable. In present embodiments, these materials are particularly effective in realizing charging-preventing effects while maintaining heat-insulation performance that aerogels intrinsically possess.

Figure 6:
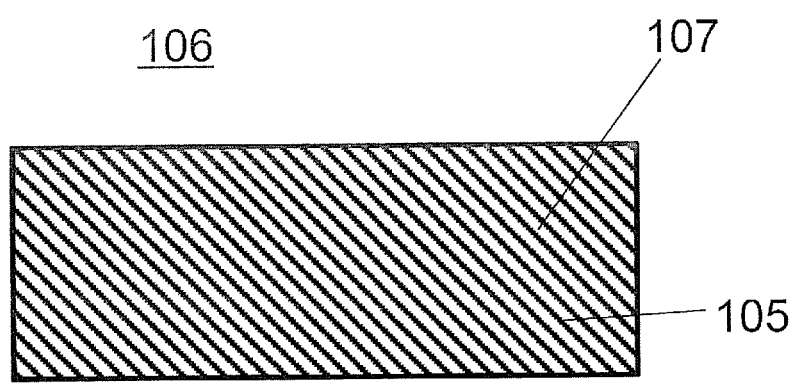
FIG. 6 shows a cross-section view of a heat-insulation material according to one embodiment.

In addition, aerogels according to embodiments can be utilized as heat-insulation materials in combination with substrates such as fibers. FIG. 6 shows a cross-section view of a heat-insulation material 106. The above aerogel 105 according to the above embodiment is located between fibers 107. The aerogel 105 that is in a sol state may be caused to penetrate into the fibers 107, or the fibers 107 may be soaked in the aerogel 105 that is in a sol state, thereby preparing the heat-insulation material 106.

Silica aerogels according to the disclosure can be utilized as heat-insulation materials, and the heat-insulation materials can preferably be available for use in home electric appliances, automobile parts, the field of architecture, industrial facilities, etc.

What is claimed is:

1. A method for producing a silica aerogel, comprising:
   (i) converting a sol into a gel by a hydrolysis reaction adding an electroconductive polymer to a high-molar-ratio-silicate solution with a silicate concentration of 10% to 20% and with a sol particle size of 1-10 nm;
   (ii) aging the gel to cause said gel to grow;
   (iii) hydrophobizing the gel; and
   (iv) drying the gel.

2. The method for producing a silica aerogel according to claim 1, wherein the electroconductive polymer is water-soluble.

3. The method for producing a silica aerogel according to claim 1, wherein the electroconductive polymer includes one of the following: (3-thiophene-ethylsulfonic acid); polyaniline; and a copolymer of ethyl 3-methyl-4-pyrrolecarboxylate and butyl 3-methyl-4-pyrrolecarboxylate.

4. The method for producing a silica aerogel according to claim 1, wherein the aqueous alkaline silicate solution is a solution that is synthesized from a water dispersion.

5. The method for producing a silica aerogel according to claim 4, wherein the electroconductive polymer is in the form of particles having a particle size of 1 to 100 nm, and a solution in which the particles of the electroconductive polymer are dispersed is added to an aqueous sol solution using water glass as a starting material to synthesize the gel.

6. The method for producing a silica aerogel according to claim 1, wherein, in step (ii), the gel is allowed to stand at 50° C. to 100° C. under ordinary pressure for 6 to 18 hours.

7. A silica aerogel comprising:
   an electroconductive polymer; and
   a water-soluble polymer,
   wherein the water-soluble polymer and the electroconductive polymer form a copolymer.

8. The silica aerogel according to claim 7, wherein the water-soluble polymer intramolecularly has at least one of the following functional groups: an amino group; a hydroxyl group; a carboxyl group; a carbonyl group; and a sulfo group.

9. The silica aerogel according to claim 7, wherein the electroconductive polymer is in the form of particles having a particle size of 1 to 100 nm.

10. A heat-insulation material, comprising:
    the silica aerogel according to claim 7; and
    fibers.

* * * * *